United States Patent
Kurono et al.

(10) Patent No.: US 9,593,742 B2
(45) Date of Patent: Mar. 14, 2017

(54) SILENT CHAIN

(71) Applicant: TSUBAKIMOTO CHAIN CO., Osaka-shi, Osaka (JP)

(72) Inventors: Yuta Kurono, Osaka (JP); Shota Miyanaga, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 78 days.

(21) Appl. No.: 14/602,888

(22) Filed: Jan. 22, 2015

(65) Prior Publication Data
US 2015/0240914 A1    Aug. 27, 2015

(30) Foreign Application Priority Data
Feb. 21, 2014   (JP) ................. 2014-031619

(51) Int. Cl.
   *F16G 13/04*   (2006.01)
   *F16G 13/08*   (2006.01)

(52) U.S. Cl.
   CPC ............ *F16G 13/08* (2013.01); *F16G 13/04* (2013.01)

(58) Field of Classification Search
   CPC .......... F16G 13/04; F16G 13/02; F16H 55/30; F01L 1/02; F01L 1/022
   USPC ............................... 474/212, 213
   See application file for complete search history.

(56) References Cited

U.S. PATENT DOCUMENTS

| | | | |
|---|---|---|---|
| 6,045,473 A | 4/2000 | Matsumoto et al. | |
| 6,440,022 B1* | 8/2002 | Ichikawa | F16G 13/04 474/161 |
| 6,500,084 B2* | 12/2002 | Wigsten | F16H 55/30 474/152 |
| 7,056,248 B2* | 6/2006 | Butterfield | F16G 13/04 474/212 |
| 7,404,778 B2* | 7/2008 | Butterfield | F16G 13/04 474/212 |
| 7,942,772 B2* | 5/2011 | Sonoda | F16G 13/04 474/206 |
| 7,972,234 B2* | 7/2011 | Sakamoto | F16G 13/04 474/212 |
| 2002/0098934 A1* | 7/2002 | Wigsten | F16H 55/30 474/212 |
| 2003/0104891 A1* | 6/2003 | Saitoh | F16G 13/04 474/212 |
| 2004/0166978 A1* | 8/2004 | Matsuda | F16G 13/04 474/212 |

(Continued)

FOREIGN PATENT DOCUMENTS

JP    10-238597 A    9/1998

*Primary Examiner* — Henry Liu
(74) *Attorney, Agent, or Firm* — Westerman, Hattori, Daniels & Adrian, LLP

(57) ABSTRACT

A silent chain is provided, which can avoid impinging contact between guide plates and sprocket teeth and prevent wear loss and noise. A guide plate includes a main guide part formed on a side that engages with a sprocket, and an additional guide part formed on at least one of front and rear edges in the longitudinal direction of the chain. The additional guide part protrudes more in the longitudinal direction of the chain than an outer flank of a middle plate arranged in the same guide row and has a size that allows the additional guide part to overlap a sprocket tooth in the chain width direction when engaged with the sprocket S.

6 Claims, 3 Drawing Sheets

(56) References Cited

U.S. PATENT DOCUMENTS

| | | | | |
|---|---|---|---|---|
| 2005/0049097 A1* | 3/2005 | Butterfield | ............. | F16G 13/04 474/206 |
| 2005/0049098 A1* | 3/2005 | Butterfield | ............. | F16G 13/04 474/212 |
| 2005/0130779 A1* | 6/2005 | Sudo | ............. | F01L 1/02 474/213 |
| 2007/0072719 A1* | 3/2007 | Sakamoto | ............. | F16G 13/04 474/212 |
| 2007/0197332 A1* | 8/2007 | Junig | ............. | F16G 13/04 474/215 |
| 2007/0287563 A1* | 12/2007 | Butterfield | ............. | F16G 13/04 474/212 |
| 2008/0015071 A1* | 1/2008 | Fujiwara | ............. | F16G 13/02 474/206 |
| 2009/0149288 A1* | 6/2009 | Sonoda | ............. | F16G 13/04 474/212 |
| 2012/0165144 A1* | 6/2012 | Dogimont | ............. | F16G 13/04 474/212 |
| 2013/0267364 A1* | 10/2013 | Motoshima | ............. | F16G 13/04 474/213 |
| 2015/0152943 A1* | 6/2015 | Ishida | ............. | F16G 13/04 474/212 |

\* cited by examiner

SILENT CHAIN

BACKGROUND OF THE INVENTION

1. Field of the Invention

The present invention relates to a silent chain made up of guide rows and non-guide rows alternately coupled together in the longitudinal direction of the chain by means of connecting pins, with the guide rows being formed of pairs of left and right guide plates, each having a pair of front and back pin holes, and middle plates arranged between the pairs of left and right guide plates and each having a pair of front and back pin holes, and the non-guide rows being formed of a plurality of inner plates, each having a pair of front and back pin holes.

2. Description of the Related Art

A silent chain has hitherto been known, which is made up of guide rows and non-guide rows alternately coupled together in the longitudinal direction of the chain by means of connecting pins inserted in pin holes. The guide rows are formed of pairs of left and right guide plates, each having a pair of front and back pin holes, and middle plates arranged between the pairs of left and right guide plates and each having a pair of front and back pin holes. The non-guide rows are formed of a plurality of inner plates, each having a pair of front and back pin holes (see, for example, Japanese Patent Application Laid-open No. H10-238597).

In the conventional silent chain, the guide plates have a guide part in the center in the longitudinal direction of the chain on the side that engages sprockets. With the silent chain wound around a sprocket, the guide parts of the guide plates overlap the sprocket teeth in the chain width direction so that the guide plates restrict the position and attitude of the silent chain relative to the sprocket in the chain width direction.

SUMMARY OF THE INVENTION

The running condition of the silent chain changes variously and sometimes the chain may vibrate laterally relative to the sprocket during running, for example. When the sprocket starts to mesh with the silent chain that is vibrating laterally, the end faces of the guide plates make impinging contact with the tips of the sprocket teeth, which leads to the problem of wear loss and noise.

The present invention is directed at solving this problem and it is an object of the invention to provide a silent chain that can avoid impinging contact between guide plates and sprocket teeth and prevent wear loss and noise.

To solve the problem described above, the present invention provides a silent chain including: guide rows formed of pairs of left and right guide plates, each having a pair of front and back pin holes, and middle plates arranged between the pairs of left and right guide plates and each having a pair of front and back pin holes; and non-guide rows formed of a plurality of inner plates, each having a pair of front and back pin holes, the guide rows and the non-guide rows being alternately coupled together in a longitudinal direction of the chain by means of connecting pins, the guide plates each including a main guide part formed on a side that engages with a sprocket, and an additional guide part formed on at least one of front and rear edges in the longitudinal direction of the chain. The additional guide part protrudes more in the longitudinal direction of the chain than an outer flank of a middle plate arranged in a same guide row, and having a size that allows the additional guide part to overlap a sprocket tooth in a chain width direction when engaged with a sprocket.

According to an aspect of the invention as set forth in claim 1, the guide plate includes, in addition to the main guide part formed on the side that engages with the sprocket, an additional guide part formed on at least one of front and rear edges in the longitudinal direction of the chain, and protruding more in the longitudinal direction of the chain than the outer flank of the middle plate arranged in the same guide row so that it overlaps a sprocket tooth in the chain width direction when engaged with the sprocket. Therefore, the position or attitude in the width direction of the silent chain can reliably be corrected at two points by the main guide part and additional guide part relative to the sprocket, so that impinging contact between guide plates and sprocket teeth when they start meshing with each other can be avoided, which helps prevent wear loss and noise.

According to an aspect of the invention as set forth in claim 2, the additional guide part is formed at least on the front edge in the longitudinal direction of the chain, so that, when the chain starts to mesh with the sprocket, the additional guide part overlaps the sprocket tooth at earlier timing to provide the effect of correcting the position or attitude of the chain.

According to an aspect of the invention as set forth in claim 3, the additional guide part is curved inward in the chain width direction, which means the distance between the left and right additional guide parts in the chain width direction is reduced, i.e., the distance between the sprocket teeth and additional guide parts when the chain engages with sprocket is reduced. In other words, the sprocket teeth can be gripped between the left and right additional guide parts, so that the effect of correcting the position or attitude of the silent chain by the additional guide part can be increased.

According to an aspect of the invention as set forth in claim 4, the additional guide part is formed to be able to deform resiliently in the chain width direction, so that excessive contact between sprocket teeth and additional guide parts is prevented, and thus wear loss caused by contact between the guide plates and sprocket teeth can be reduced.

According to an aspect of the invention as set forth in claim 5, the additional guide part is formed on both front and rear edges of the guide plate, so that, not only the effect of correcting the position or attitude of the silent chain by the main guide part and additional guide part can be improved, but also, the guide plates can have a front-to-back symmetric shape.

According to an aspect of the invention as set forth in claim 6, the additional guide part is formed on either one of front and rear edges of the guide plate, while the guide plate has a receiving space on the other one of front and rear edges of the guide plate, so that the degree of freedom in design such as size and shape of the additional guide part is increased, as well as interference between the additional guide part and the front or rear guide plate can be avoided.

DESCRIPTION OF THE PREFERRED EMBODIMENTS

Hereinafter, a silent chain 100 according to the first embodiment of the present invention will be described with reference to FIG. 1 to FIG. 3.

The silent chain 100 is configured as a timing chain incorporated in a timing system of an automobile engine, and passed over a plurality of sprockets S to run on a predetermined track. The silent chain 100 and the sprockets S constitute a silent chain transmission device.

Figure 1:
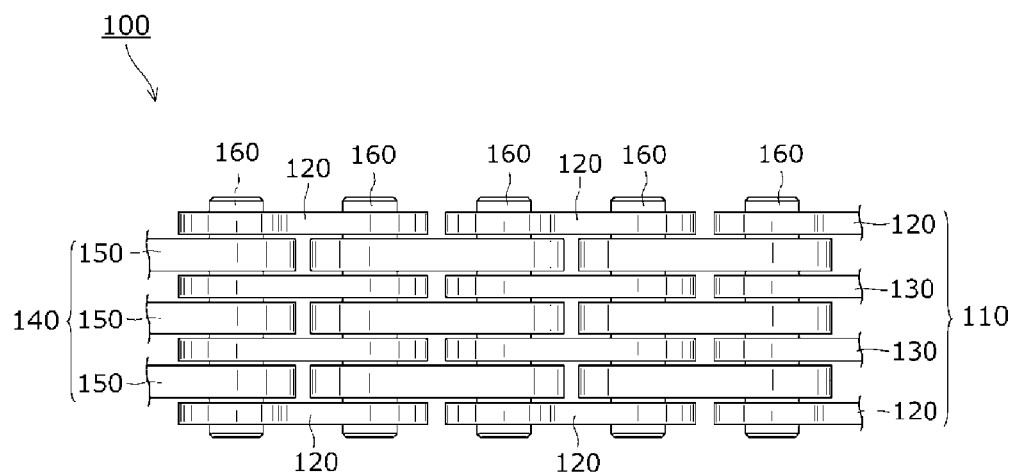
FIG. 1 is a plan view showing a silent chain according to a first embodiment.

The silent chain 100 is made up of a plurality of guide rows 110 and a plurality of non-guide rows 140, with both types of rows being offset by half a pitch and alternately arranged in a longitudinal direction of the chain, and pivotally coupled together by means of connecting pins 160, as shown in FIG. 1.

The guide rows 110 are made up of pairs of left and right guide plates 120 disposed on both outer sides in the chain width direction, and a plurality of middle plates 130 arranged between the pairs of left and right guide plates 120, as shown in FIG. 1. The non-guide rows 140 are formed of a plurality of inner plates 150 arranged side by side in the chain width direction.

The guide plates 120, middle plates 130, and inner plates 150 all have a pair of pin holes formed along the longitudinal direction of the chain. The connecting pins 160 are loosely fitted in the pin holes of the middle plates 130 and inner plates 150, while both ends of the connecting pins 160 are fixed to the pin holes in the guide plates 120, so that the plurality of guide rows 110 and the plurality of non-guide rows 140 are pivotably coupled together. The middle plates 130 and inner plates 150 each have a pair of V-shaped link teeth on the side that engages with a sprocket, to mesh with sprocket teeth S1 on the sprocket S.

Figure 2:
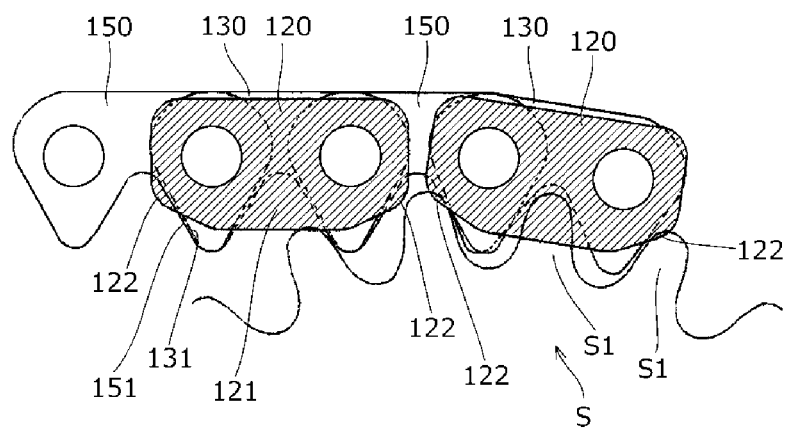
FIG. 2 is an explanatory diagram showing the silent chain according to the first embodiment engaging with a sprocket.
Figure 3:
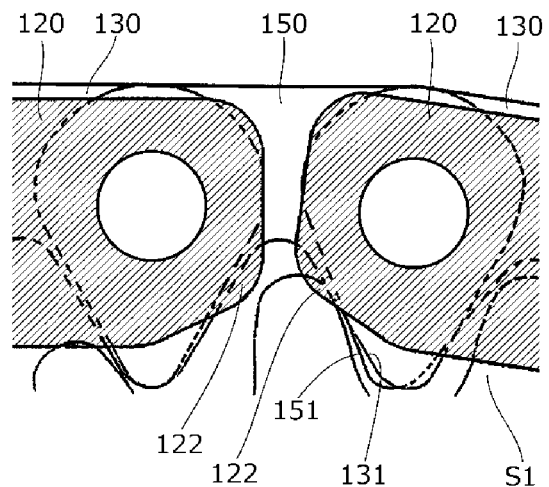
FIG. 3 is an explanatory diagram showing part of FIG. 2 on an enlarged scale.

As shown in FIG. 2, each guide plate 120 has a main guide part 121 and additional guide parts 122, which are positioned to overlap sprocket teeth S1 in the chain width direction when the silent chain 100 is passed over the sprocket S, so as to restrict the position and attitude of the silent chain 100 relative to the sprocket S in the chain width direction.

The main guide part 121 is formed in the center in the longitudinal direction of the chain on one side of the guide plate 120 that engages with the sprocket, as shown in FIG. 2.

The additional guide parts 122 are formed on both front and rear edges in the longitudinal (advancing) direction of the chain on one side of the guide plate 120 that engages with the sprocket, as shown in FIG. 2. The additional guide parts 122 protrude more in the longitudinal direction of the chain than outer flanks (outer side portions) 131 of a middle plate 130 in the same guide row 110, as shown in FIG. 2. The additional guide parts 122 protrude in the longitudinal direction of the chain more than inner flanks (inner side portions) 151 of inner plates 150 positioned front and back of the guide plate 120 and offset half a pitch, as shown in FIG. 2. These additional guide parts 122 do not interfere with the front or back additional guide parts 122 even when the silent chain 100 is passed over the sprocket S and bent maximally.

Figure 4:
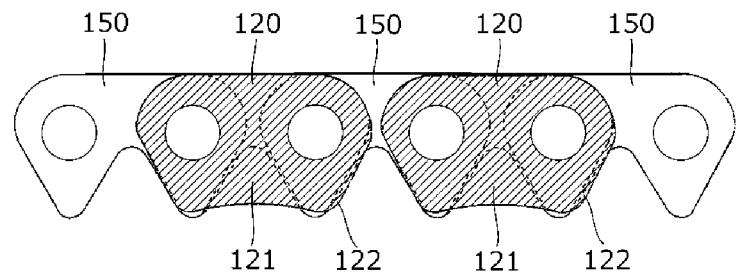
FIG. 4 is an explanatory diagram showing a silent chain according to a variation example of the first embodiment.

While, as explained above, the additional guide parts 122 are formed on both front and rear edges of the guide plate 120 in the silent chain 100 of the first embodiment, the additional guide parts 122 may be formed only on the front edges, as shown in FIG. 4. Alternatively, the additional guide parts 122 may be formed only on the rear edges.

Next, a silent chain 200 according to the second embodiment of the present invention will be described with reference to FIG. 5 and FIG. 6. The second embodiment is basically the same as the previously described first embodiment except for some parts. Therefore, elements of the second embodiment that are identical to those of the first embodiment denoted by numerals beginning with "1" herein and in the drawings will be numbered the same expect that the elements of the second embodiment start with "2" instead of "1", and explanation thereof is omitted.

Figure 5:
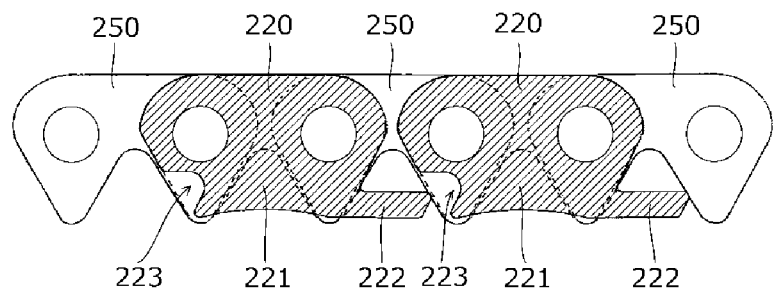
FIG. 5 is an explanatory diagram showing a silent chain according to a second embodiment.
Figure 6:
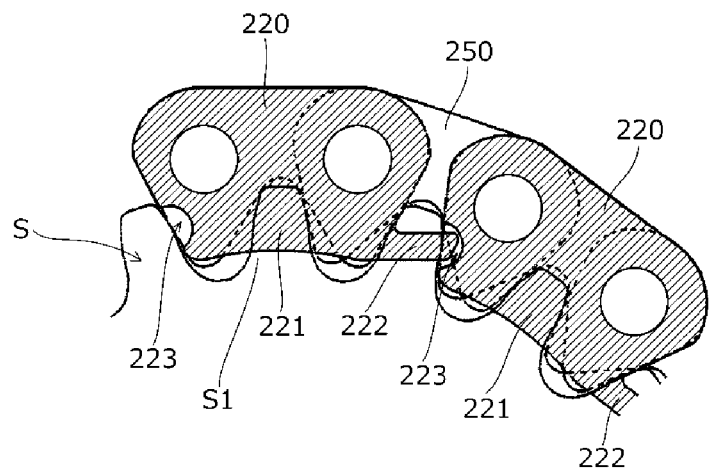
FIG. 6 is an explanatory diagram showing the silent chain according to the second embodiment engaging with a sprocket.

In the silent chain 200 of the second embodiment, as shown in FIG. 5, additional guide parts 222 are formed on the front edges of the guide plates 220 in the longitudinal direction of the chain, and receiving spaces 223 are formed on the rear edges of the guide plates 220 in the longitudinal direction of the chain.

The additional guide parts 222 are formed to extend along the longitudinal direction of the chain as shown in FIG. 5, and capable of deforming resiliently in the chain width direction. The additional guide parts 222 are curved inward in the chain width direction. In other words, the additional guide parts 222 are curved so that their distal ends are positioned further toward the inner side in the chain longitudinal direction than the plate portions of the guide plates 220.

The receiving spaces 223 are recessed inward from the rear edges of the guide plates 220 for avoiding interference with following additional guide parts 222.

The additional guide parts 222 may be formed on the rear edges of the guide plates 220, and the receiving spaces 223 may be formed on the front edges of the guide plates 220.

While the silent chain was described as a timing chain of a car engine in the embodiments above, the purpose of use of the silent chain of the present invention is not limited to this application, and may be used as any other chains such as a transmission chain or a conveyor chain. Various components of the silent chain may be made of any materials such as metal, resin, or the like.

What is claimed is:

1. A silent chain, comprising:
    guide rows formed of pairs of left and right guide plates, each having a pair of front and back pin holes, and middle plates arranged between said pairs of left and right guide plates and each having a pair of front and back pin holes; and
    non-guide rows formed of a plurality of inner plates, each having a pair of front and back pin holes, the guide rows and the non-guide rows being alternately coupled together in a longitudinal direction of the chain by means of connecting pins,
    said guide plates each including a main guide part formed on a side that engages with a sprocket, and an additional guide part formed on at least one of front and rear edges in the longitudinal direction of the chain,
    said additional guide part protruding more in the longitudinal direction of the chain than the outer flank of the middle plate arranged in a same guide row and having a size that allows the additional guide part to overlap a sprocket tooth in a chain width direction when engaged with a sprocket, at least one area of an outer edge of the additional guide part is formed in a curved shape such that the additional guide part do not interfere with the front or back additional guide part even when the silent chain is passed over the sprocket and bent maximally, and a part having an outer edge extending straightly and obliquely relative to a pitch line of the silent chain is provided between the main guide part and the additional guide part.

2. The silent chain according to claim 1, wherein said additional guide part is formed at least on the front edge of the guide plate in the longitudinal direction of the chain.

3. The silent chain according to claim 1, wherein said additional guide part is curved inward in the chain width direction.

4. The silent chain according to claim 1, wherein said additional guide part is capable of deforming resiliently in the chain width direction.

5. The silent chain according to claim 1, wherein said additional guide part is formed both on the front edge and the rear edge of said guide plate.

6. The silent chain according to claim 1, wherein
said additional guide part is formed on one of the front edge and the rear edge of said guide plate, and
said guide plate includes a receiving space on the other one of the front edge and the rear edge of said guide plate.

* * * * *